(12) United States Patent
Zhang et al.

(10) Patent No.: US 11,941,744 B2
(45) Date of Patent: *Mar. 26, 2024

(54) METHODS AND SYSTEMS FOR MOTION VECTORS IN 3D GRAPHICS

(71) Applicant: Pixelworks Semiconductor Technology (Shanghai) Co. Ltd., Shanghai (CN)

(72) Inventors: Hongmin Zhang, Santa Clara, CA (US); Miao Sima, Shanghai (CN); Zongming Han, Shanghai (CN); Gongxian Liu, Shanghai (CN); Junhua Chen, Shanghai (CN); Guohua Cheng, Shanghai (CN); Baochen Liu, Shanghai (CN); Neil Woodall, Newport Beach, CA (US); Yue Ma, Los Altos, CA (US); Huili Han, Shanghai (CN)

(73) Assignee: PIXELWORKS SEMICONDUCTOR TECHNOLOGY (SHANGHAI) CO. LTD., Shanghai (CN)

( * ) Notice: Subject to any disclaimer, the term of this patent is extended or adjusted under 35 U.S.C. 154(b) by 133 days.

This patent is subject to a terminal disclaimer.

(21) Appl. No.: 17/656,129

(22) Filed: Mar. 23, 2022

(65) Prior Publication Data

US 2023/0274489 A1    Aug. 31, 2023

(30) Foreign Application Priority Data

Feb. 28, 2022 (CN) .......................... 202210195150.7

(51) Int. Cl.
G06T 15/04 (2011.01)
G06T 15/00 (2011.01)

(52) U.S. Cl.
CPC ............ *G06T 15/04* (2013.01); *G06T 15/005* (2013.01)

(58) Field of Classification Search
CPC .............................. G06T 15/04; G06T 15/005
See application file for complete search history.

(56) References Cited

U.S. PATENT DOCUMENTS

| | | |
|---|---|---|
| 9,094,561 B1 | 7/2015 | Cheng et al. |
| 9,106,926 B1 | 8/2015 | Li et al. |
| 9,357,161 B1 | 5/2016 | Cheng et al. |
| 2013/0342644 A1* | 12/2013 | Rusanovskyy ...... H04N 19/597 348/43 |
| 2019/0340812 A1* | 11/2019 | Fuetterling ............... G06T 9/00 |
| 2020/0222019 A1* | 7/2020 | Katsevich ................ G06T 7/20 |

* cited by examiner

*Primary Examiner* — Michelle Chin
(74) *Attorney, Agent, or Firm* — McCoy Russell LLP (57) ABSTRACT

Various methods are provided for generating motion vectors in the context of 3D computer-generated images. An example method includes generating, for each pixel of one or more objects to be rendered in a current frame, a 1-phase motion vector (MV1) and a 0-phase motion vector (MV0), each MV1 and MV0 having an associated depth value, to thereby form an MV1 texture and an MV0 texture; converting the MV1 texture to a set of MV1 blocks and converting the MV0 texture to a set of MV0 blocks; and outputting the set of MV1 blocks and the set of MV0 blocks for image processing.

20 Claims, 6 Drawing Sheets

METHODS AND SYSTEMS FOR MOTION VECTORS IN 3D GRAPHICS

CROSS REFERENCE TO RELATED APPLICATIONS

The present application claims priority to Chinese Patent Application No. 202210195150.7, entitled "METHODS AND SYSTEMS FOR MOTION VECTORS IN 3D GRAPHICS," and filed on Feb. 28, 2022. The entire contents of the above-listed application is hereby incorporated by reference for all purposes.

FIELD

Embodiments of the subject matter disclosed herein relate to the field of three-dimensional (3D) computer graphics, and in particular how to improve the rendering of interpolated frames within a 3D environment.

BACKGROUND

Over the years, an increase in computer processing power has enabled real-time video rendering, for example for video games or certain animations, to become increasingly sophisticated. For example, whereas early video games featured pixelated sprites moving on a fixed background, contemporary video games feature photorealistic three-dimensional scenes filled with characters. Meanwhile, the miniaturization of processing components has enabled mobile devices, such as handheld video game devices and smartphones, to effectively support real-time rendering of high-frame rate, high-resolution video.

3D graphical video may be output in a variety of different framerates and screen resolutions. It may be desired to convert video with 3D graphics from one framerate (and/or resolution) to another framerate (and/or resolution). In order to save computational power while still increasing the framerate, interpolated frames can be used instead of rendering all frames within a video. Interpolated frames can be effectively generated through the use of motion vectors (also referred to herein as MVs), which track the difference in position of objects between the current frame (CF) and the previous frame (PF).

BRIEF DESCRIPTION

Embodiments are disclosed herein for the calculation and transmission of motion vectors in the context of 3D computer graphics. In one example, a method includes generating, for each pixel of one or more objects to be rendered in a current frame, a 1-phase motion vector (MV1) and a 0-phase motion vector (MV0), each MV1 and MV0 having an associated depth value, to thereby form an MV1 texture and an MV0 texture; converting the MV1 texture to a set of MV1 blocks and converting the MV0 texture to a set of MV0 blocks; and outputting the set of MV1 blocks and the set of MV0 blocks for image processing.

DETAILED DESCRIPTION

Systems and methods for calculating motion vectors for use in frame interpolation, framerate conversion, or other actions are described herein. As explained previously, motion vectors may be generated which track the difference in position of objects between a current frame (CF) and a previous frame (PF). As explained herein, two types of motion vectors may be utilized to interpolate frames, 1-phase MVs (MV1) and 0-phase MVs (MV0). MV0 represents motion from the PF to the CF and MV1 represents motion from the CF to the PF. The MVs are generated for each pixel (or group of pixels) on the screen, forming a texture, or collection of MVs for the pixels on the screen. As used herein, a texture is defined to be a map from the collection of pixels in a frame to a collection of one or more numbers (e.g. components of a vector or single numbers).

If motion vectors are used in a framerate conversion process, typical rendering engines output only the MV1 texture in two dimensions. As such, the texture contains no depth content, and only includes information about changes in the relative screen positions as viewed in the reference frame of the virtual camera. Utilizing depth for the pixelwise motion vectors may inform how to compute the 2D components of block motion vectors. Block motion vectors may represent an average of the motion vectors for a block of pixels (e.g., a five by five block of pixels) and may be utilized for frame interpolation or other image processing tasks in order to reduce processing demands, for example. Areas of the scene within certain ranges of depth are called foreground (close to the camera), background (far from the camera), or mid-range (between foreground and background). It may be desirable in image processing to determine which depth range dominates each block of pixels: either foreground, background, or mid-range.

As an example, two objects may be positioned at different distances from a (virtual) camera or viewpoint. If the two objects move in the same direction, in equal world-space distances, the object which is farther away may appear to move a smaller distance in the eye space, creating a parallax effect where objects which are farther away from the viewpoint appear to move less than objects that are closer to the viewpoint.

In the case that a majority of pixels in the block are in the background, the majority of pixels will have small MVs, since MVs are evaluated from the perspective of the camera/viewpoint. If a small amount of the pixels in the block are, for example, in the foreground, the foreground pixels will have motion vectors with larger magnitudes. If all motion vectors within the block were to be averaged, the (relatively few) MVs of the foreground would dominate the average MV. This may misrepresent the relatively small apparent motion of the background pixels, favoring the MVs of the foreground pixels instead. The magnitude of the background MVs may also be strongly influenced by the movement of the camera. MVs of pixels within the background may also be large, potentially increasing the error of the average in an undesirable way.

By including the depth information in the pixel MVs, the dominant depth range of each block may be resolved: either foreground, background, or mid-range. Motion vector values within the block which do not fall into the dominant range may then be disregarded in favor of evaluating the average of only the pixels within the dominant range. In the case of a block dominated by background pixels, the resulting motion vector may more closely match the motion occurring within the frame.

Added depth information may also offer additional flexibility for the image processing module. Depth components of the MVs may be used, for example, as an input to a weighting function which may, in turn, be used to apply varying levels of image correction to areas of different depth.

Thus, according to embodiments described herein, a depth texture may be attached to MV1, which allows for more accurate frame interpolation by taking changes in depth into account. In addition, an MV0 texture with depth may similarly be generated. Both MV0 and MV1 can be used as inputs to framerate conversion algorithms, helping in the interpolation step.

In addition, each frame may be composed of two kinds of objects: those with motion vectors and those without. Objects featuring motion vectors may include moving characters or other objects, the view of the user, and parts of an in-game map. Objects without motion vectors may include, for example, smoke effects, full- or partial-screen scene transitions (e.g. fades and wipes), overlays such as graphical user interface elements and gun reticules, and/or particle effects. By separating objects with motion vectors from objects without motion vectors, improved image processing can be performed. Traditionally, algorithms may attempt to exclude screen regions which feature objects without motion vectors. However, this approach is imperfect and may lead to the blending of nearby objects during the process of framerate conversion. Separation of objects with and without motion vectors before transmission to an image processor may then reduce the artifacts caused by the traditionally-known method of exclusion. Separation of the objects may yield two channels which together comprise the frame data.

Traditionally, motion vectors are also sampled on a pixel-by-pixel basis, such each pixel on the screen has an associated MV0 and MV1. However, the sampling resolution for motion vectors can be dynamically reduced or increased. Reducing the resolution may also reduce the computational power required for MV calculation. Since many devices (e.g. smartphones) have limited computational resources and battery life, reductions in computational cost may save on processing power and batter life. As described herein, "pixelwise" or "pixel-by-pixel" may not refer to individual pixels, but may instead refer to collections of pixels in the context of evaluating motion vectors. Low-resolution MV generation may be performed, in some embodiments, by lowering the sampling resolution when calculating the MVs. For example, MVs may only be computed for every fourth pixel in the x-direction and every fourth pixel in the y-direction.

The motion vectors described here are first generated on a pixel-by-pixel basis, then translated to a block form with a depth texture. Since objects with MVs and objects without MVs may be separated within each frame, the block MVs may then be transmitted to the image processing module 222 alongside either the frame data containing objects with MVs or frame data containing objects without MVs. One of the channels may include an alpha layer, which may inform the image processing module of how to blend the objects with MVs and the objects without MVs when rendering the frame. The image processing module may perform visual enhancements using the block motion vectors, such as framerate conversion, for example.

By separating objects with MVs and objects without MVs, exclusion algorithms may not be necessary. Separation may therefore allow for the generation of interpolated frame data, even in regions obscured by particle effects. Including depth information in the pixel MV may allow for more accurate block MV calculation, since blocks dominated by pixels in the background may be better represented than by taking the block average.

Aspects of the present disclosure are described herein with reference to flowchart illustrations and/or block diagrams of methods, apparatus, and computer program products according to the embodiments disclosed herein. Insofar as such block diagrams, flowcharts, and/or examples contain one or more functions and/or operations, it will be understood by those of skill in the art that each function and/or operation within such block diagrams, flowcharts, or examples can be implemented, individually and/or collectively, by computer readable instructions using a wide range of hardware, software, firmware, or virtually any combination thereof. The described systems are exemplary in nature, and may include additional elements and/or omit elements. The subject matter of the present disclosure includes all novel and non-obvious combinations and sub-combinations of the various systems and configurations, and other features, functions, and/or properties disclosed. Thus, the methods may be performed by executing stored instructions on machine readable storage media with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Figure 1:
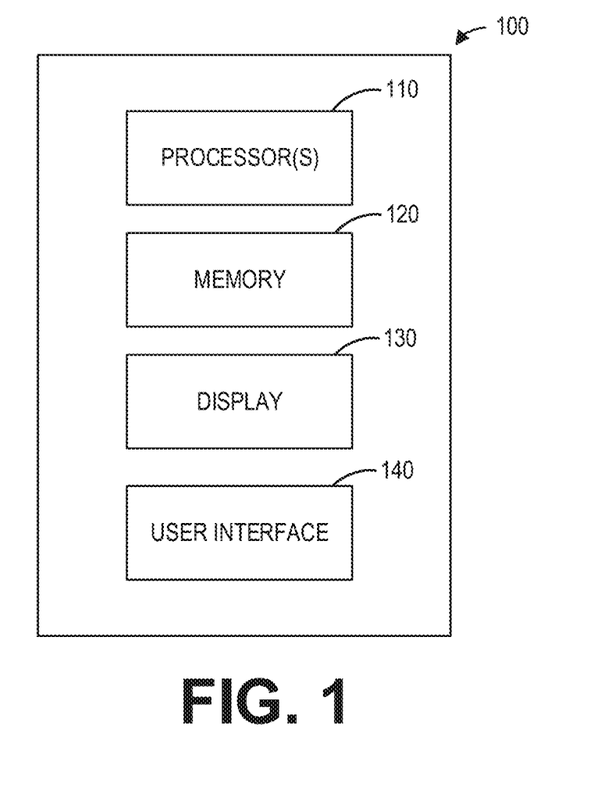
FIG. 1 shows an example diagram of a computing system.

FIG. 1 schematically depicts an example of a computer system 100 which may include one or more processors 110 (e.g. central processing units, (CPUs) and/or graphics processing units (GPUs)), volatile and/or nonvolatile memory 120 (e.g. random-access memory (RAM) and/or one or more hard disk drives (HDDs)). The computer system may also include one or more displays 130, which may comprise any number of visual interface technologies. In addition, example embodiments may include a user interface 140, e.g. keyboards, computer mice, touch screens, controllers, etc. to allow users to provide input to the computer system. In some embodiments, the computer system may be a mobile phone or tablet.

Figure 2:
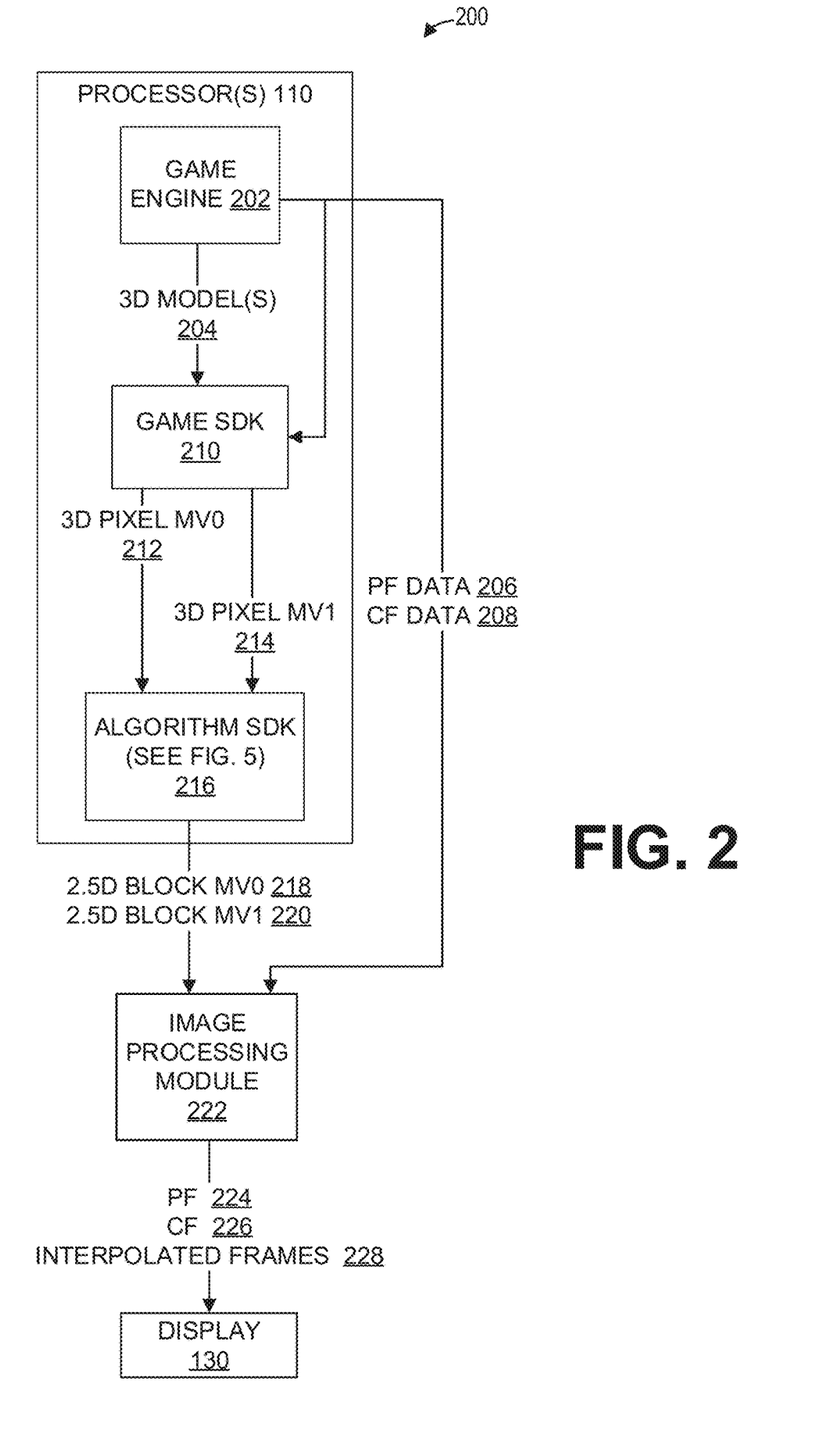
FIG. 2 is an example block diagram schematically illustrating a pipeline for the transmission and usage of motion vector data.

FIG. 2 shows a block diagram 200 schematically illustrating a pipeline for generating and using MVs, including the components that may generate and process MVs. Block diagram 200 includes a game engine 202 which outputs one or more 3D models. The game engine 202 may be configured to generate and output 3D models 204 to be rendered, which may specify the desired locations for objects, and possibly any particle effects. The game engine 202 produces a plurality of image frame data in a sequence, which may include CF data 208 and PF data 206. The previous frame data can be sourced from a cached version of the current frame (e.g., only the current frame data may be output by the game engine 202 and the previous frame data may be retrieved from memory). Thus, the current frame data will become the previous frame data for the next frame to be rendered. Ultimately, one or more interpolated frames may be generated between the CF and PF. The 3D models 204 are output to a 3D motion vector module, which in the current example may be a software development kit and thus referring to as a game SDK 210, which uses internal rendering matrices and the information from the 3D models to generate 3D pixel MV0 texture 212 and a 3D pixel MV1 texture 214. The 3D pixel MV1 texture 214 may include a plurality of 3D MV1s, one for each pixel or group of pixels. Each 3D MV1 (e.g., for a respective pixel) may include a change in a vertical position, a change in a horizontal position, and a change in a depth position of an object at that pixel from a current frame to a previous frame. The 3D pixel MV0 texture 212 may include a plurality of 3D MV0s, one for each pixel or group of pixels. Each MV0 (e.g., for a respective pixel) may include a change in a vertical position, a change in a horizontal position, and a change in a depth position of an object at that pixel from the previous frame to the current frame.

The process of generating the 3D pixel MV0 texture 212 and the 3D pixel MV1 texture 214 may include generating a plurality of possible MVs for one or more pixels, due to the non-exclusive projection of the object from the PF to the CF. In the 2D domain, one pixel in the PF may be projected to a plurality of pixels in the CF. The plurality of possible MVs are then compared to the depth textures and other objects within the 3D scene in order to double-confirm the MVs. Double-confirmation is a process of selecting the correct MV from the plurality of MVs. One example method is to compare the depth buffers of the 3D pixel MV0 212 and the 3D pixel MV1 214 to the depth textures of the PF and the CF, respectively.

The (double-confirmed) 3D pixel MV0 texture 212 and the (double-confirmed) 3D pixel MV1 texture 214 may then be output to a block motion vector module, which in the current example may be a software development kit and thus may be referred to as an algorithm SDK 216, which may process the input to generate a 2.5D block texture MV0 218 and a 2.5D block MV1 texture 220, which are textures that may be utilized in generating interpolated frames. The block textures are generated from a process which averages the motion vector values within each of a plurality of blocks (as explained below with respect to FIG. 5). The 2.5D block MV0 texture 218 and the 2.5D block MV1 texture 220 are output to an image processing module 222, which may or may not be a piece of hardware separate from the other processor(s) 110, which also receives the CF data 208 and the PF data 206. The CF data may be transferred on two physically separate or logically separate channels, one for objects with MVs and one for objects without MVs. The 2.5D block MV0 texture 218 and the 2.5D block MV1 texture 220 may be included within the channel containing objects with MVs. One channel may include an alpha layer which may provide data about how to blend the objects with MVs and objects without MVs. The separated data may be transmitted on two physically separated or two logically separated channels to the image processing module 222.

The image processing module 222 may then perform an interpolation step or a framerate conversion, using the 2.5D block MV0 texture 218 and the 2.5D block MV1 texture 220 as inputs, as well as the PF data 206 and CF data 208. The image processing module 222 may output a previous frame (PF) 224, one or more interpolated frames 228, and a current frame 226, which may then be visually displayed (in the order listed) on display 130. Generating the interpolated frames 228 therefore allows for the framerate to be increased.

The game engine 202, the game SDK 210, and the algorithm SDK 216 may each execute on the same processor(s) 110 of the computer 100 or on different processors according to instructions stored in memory 120. The image processing module 222 may be a separate piece of hardware than the game engine 202, the game SDK 210, and the algorithm SDK 216, at least in some examples.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

It should be noted that the techniques discussed herein apply not only to games, but to any animated renderings of 3D models, though the advantages offered by this method may be most noticeable in real-time rendering situations.

Figure 3:
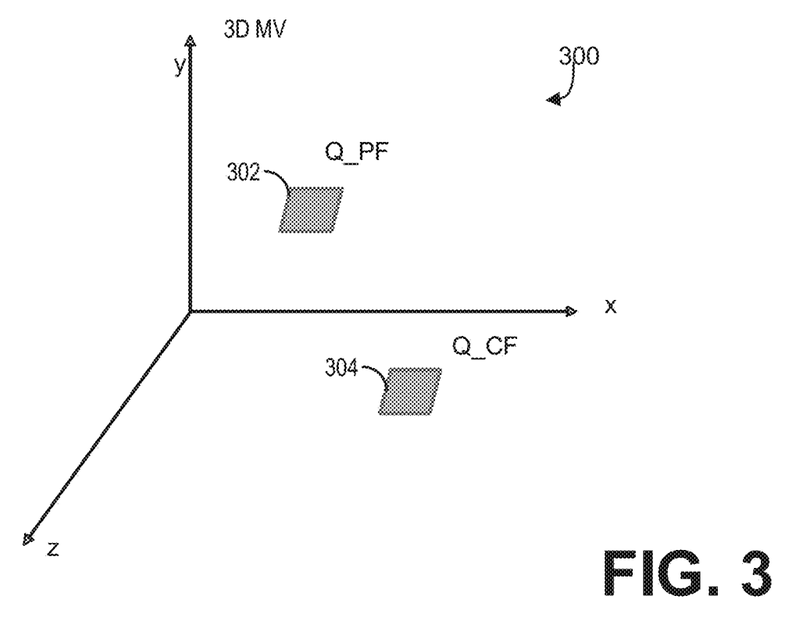
FIG. 3 shows an example 3D coordinate system and two points in 3D space.

FIG. 3 shows a 3D coordinate system 300 with two three-dimensional points Q_PF 302 and Q_CF 304. Both points have x, y, and z coordinates, with Q_PF 302 having coordinates of $(x_0, y_0, z_0)$ and Q_CF having coordinates of $(x_1, y_1, z_1)$. The z value is also known as the depth, which, in some examples, is provided by a separate texture or may need to be calculated using, for example a method involving a ray going from the camera location to the points' locations. From these two points in space, two 3D motion vectors may be calculated using, for example, $$MV0=(x_0-x_1,y_0-y_1,z_0-z_1)=(\Delta x_0,\Delta y_0,\Delta z_0),$$

$$MV1=(x_1-x_0,y_1-y_0,z_1-z_0)=(\Delta x_1,\Delta y_1,\Delta z_1)=-MV0.$$

According to these definitions, MV0 represents the 3D change experienced by an object going from the Q_PF 302 to Q_CF 304. On the other hand, MV1 represents a change in the opposite direction: from Q_CF 304 to Q_PF 302.

Although the 3D motion vectors of FIG. 3 show points in 3D space, these points are projected onto a 2D display in order to be viewed. In conventional examples, the motion vectors are generated as a 2D texture, which is then used to generate visual enhancements and create interpolated frames. The embodiments described herein use a depth texture in addition to the conventional MV information, but in a distinct way from a purely 3D MV. This depth texture can be calculated, for example, by drawing a ray from the camera's location to the locations of the objects as viewed from the near clip. The near clip, as defined herein, is the closest plane of the 3D space in which objects are still visible. Objects closer than the near clip are not visible in the scene. In some examples, the game engine may provide the depth for use in the algorithm.

Thus, the method of calculating 3D MV0s and 3D MV1s may be applied to generate the 3D pixel MVs discussed above with respect to FIG. 2, which are then double-confirmed according to a process described in more detail below. The double-confirmed 3D pixel MV0s and double-confirmed 3D pixel MV1s may be converted to 2.5D block MV0s and 2.5D block MV1s which are then output to an image processing module for use in framerate conversion, for example.

Figure 4:
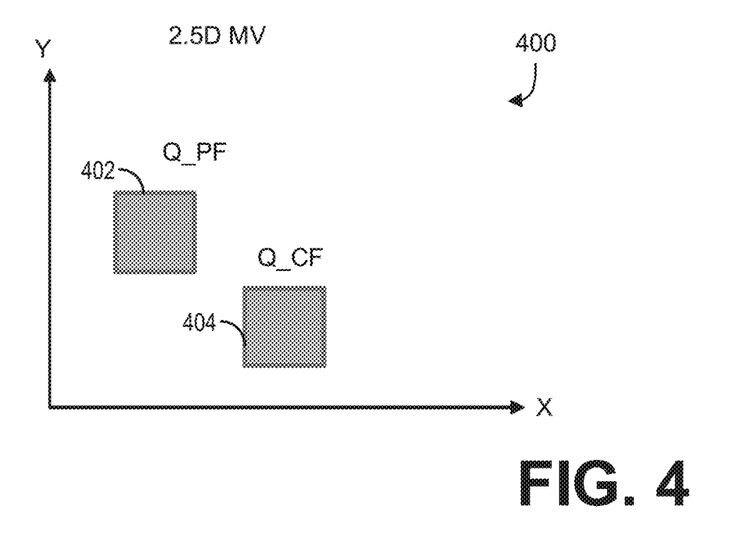
FIG. 4 shows an example 2D coordinate system and two points in 2D space.

FIG. 4 illustrates how 2.5D motion vectors may be calculated and thus shows a 2D coordinate system 400 with the projection of Q_PF 402 and the projection of Q_CF 404. These projected points have only x- and y-coordinates. Projections may be performed through the use of rendering matrices applied to points in 3D space, such as the rendering matrices discussed above with respect to FIG. 2. The 2D coordinate system 400 may represent, for example, the apparent positions of pixels on a 2D screen, as viewed from the perspective of a virtual camera. Using the projected coordinates and the depth values of the two points, the 2.5D motion vectors can be calculated. Note that these are distinct from the 3D motion vectors. The 2.5D motion vectors may be computed as, for example, $$MV0_{2.5D} = (\Delta x_0, \Delta y_0, z_0),$$

$$MV1_{2.5D} = (\Delta x_1, \Delta y_1, z_1) \neq -MV0_{2.5D}$$

Figure 5:
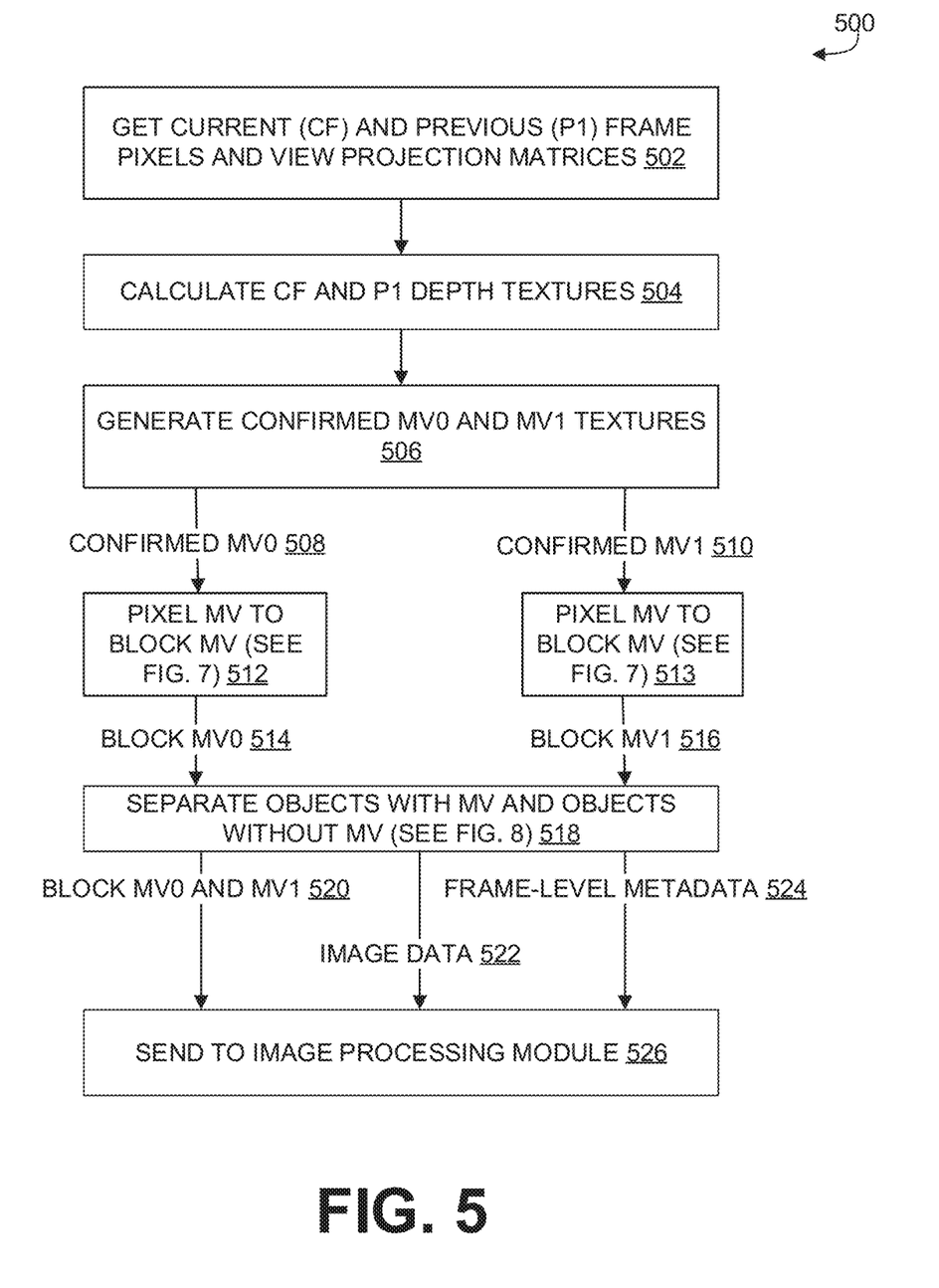
FIG. 5 shows a flowchart illustrating a method for creating a 2.5D block MV0 and a 2.5D block MV1, along with output to an image processing module, according to an example of the present disclosure.

Note that the change in depth between the frames is not recorded in either case, and that the raw depth values $z_1$ and $z_0$ are used. FIG. 5 shows a flowchart for a method 500 for generating 2.5D block motion vectors. Method 500 may be carried out according to instructions stored in computer memory, such as memory 120, and executed on one or more processors, such as processors 110. In some examples, method 500 may be carried out by the game SDK 210 and/or the algorithm SDK 216 of FIG. 2. At 502, CF and PF frame pixels and view projection matrices (e.g., rendering matrices) are acquired. In some examples, the CF and PF frame pixels and view projection matrices are received from the game SDK 210 or the game engine 202. The depth textures of CF and PF are calculated at 504. The depth textures may include a change in depth of a respective object for each pixel from the CF to the PF (for the MV1 texture) and a change in depth of a respective object for each pixel from the PF to the CF (for the MV0 texture). At 506, a double-confirmation process is applied to double-confirm each 3D pixel MV1 and MV0 of the textures. Double confirmation selects the correct motion vectors from one or more possible choices, depending on factors such as occlusion of pixels and may help to render more accurate motion vectors. To double-confirm an MV1 or MV0 for a selected pixel, the method may confirm that the coordinates of the selected pixel in the current frame match coordinates of that pixel mapped back to the previous frame using the MV1 or MV0 for the selected pixel, where the coordinates of the selected pixel include a depth coordinate. The MV0 may be confirmed by using the MV0 to project a PF pixel to the CF. If the projected pixel matches the corresponding pixel in the CF (e.g., or nearly matches, such as within a threshold range of the corresponding pixel in the CF), the MV0 is confirmed. The MV1 may be confirmed similarly, by projecting a pixel from the CF to the PF and comparing the projected pixel to the corresponding pixel in the PF. If both the MV0 and MV1 are confirmed, the MVs are called correct.

For example, in the 2D domain, one pixel in the PF could be projected by several pixels (or none, if the object/pixel in the PF is covered by an object in the CF) in the CF. In the 3D domain, there is a one-to-one correspondence for each pixel. The depth buffer may then be used to decide which MV is correct:

Depth_buffer[i]=cf_mv_z_i+depth_i; if
    Depth_PF=Depth_buffer[j], then buffered $MV\_j$
    is the correct $MV0$.

Additionally or alternatively, a MV of a pixel in PF (with coordinates X0, Y0, depth0) is (delta_x0, delta_y0, delta_z0). The corresponding pixel in CF may have coordinates (X1, Y1, depth1). If X1=X0+delta_x; Y1=Y0+delta_y; and depth1=depth0+delta_z, then this pixel is called double confirmed. Anything that is not double-confirmed is outside a double-confirmed region. Put another way, if the MV of a pixel in CF (with coordinates X1, Y1, depth1) is (delta_x1, delta_y1, delta_z1), if delta_x0=−delta_x1, delta_y0=−delta_y1, and delta_z0=−delta_z1, the pixel Q_CF and Q_PF are double-confirmed.

If a pixel/MV is determined to be in an unconfirmed region, any non-confirmed MV1s and/or MV0s may be adjusted based on a nearest double-confirmed MV1 and/or MV0 (or nearest double-confirmed MV1 or MV0 of the same object) to transform the one or more non-confirmed MV1s and/or MV0s into one or more double-confirmed MV1s and/or MV0s. For example, for a given pixel P0, the nearest pixel with a double-confirmed MV may be PF. To adjust the MV for P0, the MV0 for P0 may be the sum of the MV1 for PF and a delta MV for PF. The delta MV for PF may be calculated as MV0 for PF plus MV1 for P0. The double confirmed 3D pixel MV0s may be output at 508 and the double-confirmed 3D pixel MV1s may be output at 510 (e.g., to the algorithm SDK). Using the double-confirmed 3D pixel MV0s, a 2.5D block MV0 is generated at 512 and the 2.5D block MV0 is output at 514. Similarly, the double-confirmed 3D pixel MV1s are converted to a block MV1 at 513 and the block MV1 is output at 516. To convert the 3D pixel MV1s to 2.5D block MV1s, for each pixel block of a plurality of pixel blocks, a predominant pixel type in that pixel block is identified. If the predominant pixel type is background pixels, an average MV1 is calculated over all pixels in that pixel set. Otherwise, the average MV1 is calculated over only foreground pixels in that pixel set. The average MV1 is then set as the MV1 for that pixel block, wherein the set of MV1 blocks comprises the average MV1 for each pixel block. A similar process may be performed for the conversion of the 3D pixel MV0s to 2.5D block MV0s. Further, rather than include the change in depth in the MVs, the change in depth is replaced with the depth value for that pixel. The 3D MVs represent motion of objects between frames in three dimensions. 2.5D MVs represent motion of objects within the 2D screen, with a depth value added to represent occlusion of objects. That is, the depth value represents which objects are in front of others, which may help in the generation of interpolated frames.

At 518, objects with MVs and objects without MVs are separated into two channels. In some embodiments, the channels are physically separate. When physically separate channels are infeasible, logically separate channels (either in space or in time) may be used. Separating the objects with MVs from objects without MVs may remove the need to exclude regions from the screen when performing framerate conversion. Exclusion algorithms may produce visual artifacts at the boundaries of regions with particle effects. Separating these objects allows them to be processed differently, improving the result.

Various information is sent to the image processing module at 526. The information that is sent to the image processing module includes block MV0 and MV1, as indicated at 520, as well as image data, as indicated at 522, and frame-level metadata, as indicated at 524. The image data 522 may include the objects discussed above and thus the image data 522 may be sent over more than one physical or logical channel.

Figure 6:
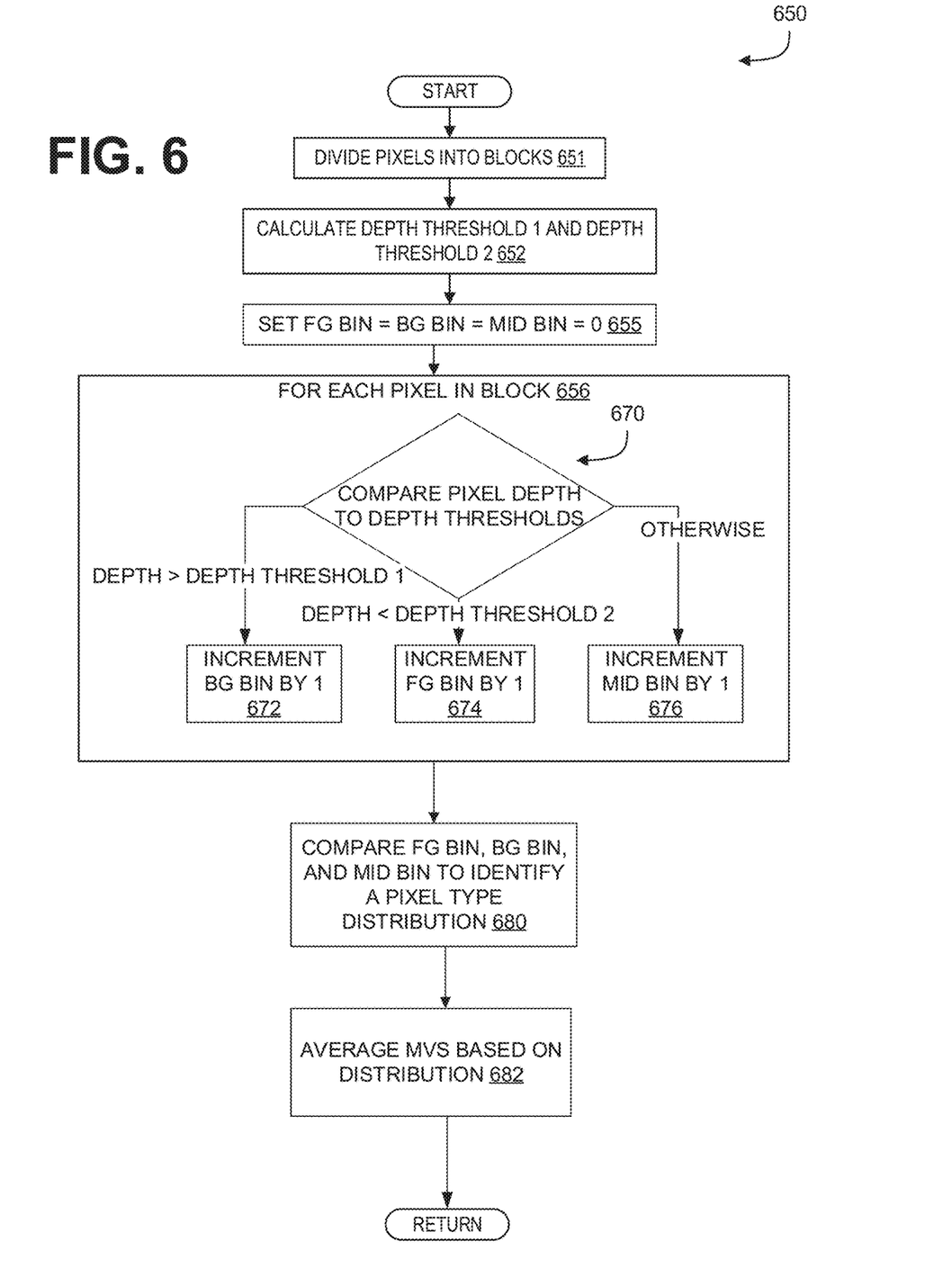
FIG. 6 shows a flowchart illustrating a method for calculation of block motion vectors, taking pixelwise motion vectors as input, according to an example of the present disclosure.

FIG. 6 shows a method 650 to compute a block MV from a pixel-by-pixel MV. The method 650 occurs during the pixel MV to block MV conversion performed at 512 and 513 of method 500, which may be computed using the processor(s) 110 and instructions in memory 120. At 651, the pixels on the screen are divided into a plurality of blocks, e.g. finitely sized, rectangular collections of pixels. In one example (see FIG. 7), the blocks may be four-by-four squares of pixels. In general, the blocks do not need to be equally-sized or square. At 652, two depth thresholds (depth threshold 1 and depth threshold 2) are calculated. The depth thresholds may be given, for example, by $$DepthThreshold_1 = Depth_{Max} - \frac{Depth_{Max} - Depth_{Min}}{4},$$

$$DepthThreshold_2 = Depth_{Min} + \frac{Depth_{Max} - Depth_{Min}}{4},$$

where $Depth_{max}$ is the maximum depth value for the block and $Depth_{min}$ is the minimum depth value in the block. In this example, a greater depth corresponds to an object further away from the camera or viewer.

At 655, foreground (FG), background (BG), and mid-range (MID) bins are created and each given initial values of 0. The sizes of each bin may be stored as $N_{FG}$, $N_{BG}$, and $N_{MID}$. As indicated at 656, for each pixel in the block, the depth value of the pixel (and therefore the depth value of the 2.5D motion vector) is compared to the two thresholds at 660. If the depth is greater than depth threshold 1, the BG bin is incremented at 672. If the depth is less than depth threshold 2, the FG bin is incremented at 674. Otherwise, the MID bin is incremented at 676. Note that for each pixel within the block, only one bin should be incremented.

Once each pixel within the block has been compared, the values of the FG bin, the BG bin, and the MID bin are compared at 680 to identify a distribution of pixel types. Pixel type distribution identification may be performed to determine whether or not the depth components of the MVs within the block exhibit a bimodal distribution; a bimodal distribution may indicate the presence of two objects within the block: a foreground object and a background object. If a bimodal distribution is not detected, disregarding the MVs with extreme depth components (e.g., those determined to be in the foreground or background range) may result in a more stable distribution. In such a case, the mid-range pixels should be averaged. However, since the disclosed methods create only three bins to classify pixels, and the number of pixels in each block may be small (e.g. 16), a bimodal distribution may appear to be skewed towards either the foreground and background bins. Either case may indicate the presence of a foreground object. The size of the predominant bin, herein labelled as N, may be given, for example, by a process specified by the following pseudo-code:

```
IF N_MID < N_FG THEN
    IF N_FG > K_1 N_BG THEN
        SET N = N_FG
    ELSE SET N = N_BG
    END IF
ELSE IF N_MID < N_BG THEN
    IF N_FG > K_2 N_BG THEN
        SET N = N_FG
    ELSE SET N = N_BG
    END IF
ELSE
    SET N = N_MID
END IF
```

Note the two constants, $K_1$ and $K_2$, may be chosen such that $0 \leq K_1 \leq 2$ and $K_1 \leq K_2$. Both constants may be determined empirically to achieve stable distributions in the depth components of the block MVs. In some embodiments, $K_1=K_2=0$. In this way, when a bimodal distribution is detected (e.g., where at least one foreground pixel and at least one background pixel are included in a block) such that a foreground object and a background object are detected in the block, only the MVs for the foreground pixels are averaged and set as the block MV for the block (even if more background pixels are present in the block than foreground pixels), which may allow for the preservation of the foreground object in the interpolated frame(s) that may otherwise be missed. When a bimodal distribution is not detected, only one object is detected in the block (whether foreground or background) and only the MVs for the mid-range pixels are averaged and set as the block MV for the block.

At 682, method 650 includes a step to average the MVs based on the distribution of the pixel types. For example, the block MV may be given by a formula such as $$(MV_x, MV_y, depth)_{block} = \frac{1}{N} \sum_{i=1}^{N} (MV_x, MV_y, depth)_{pixel\,i},$$

where N represents which bin is being averaged over, as determined by step 680 above. The sum is performed over all pixelwise MVs (either MV0 or MV1) within the bin corresponding to N, e.g. if $N=N_{BG}$, the sum is performed over all background pixels, etc. Addition here is performed according to standard vector addition, e.g. $(x_1, y_1, z_1)+(x_2, y_2, z_2)=(x_1+x_2, y_1+y_2, z_1+z_2)$. Method 650 then returns, using the averaged MV as its return value.

Figure 7:
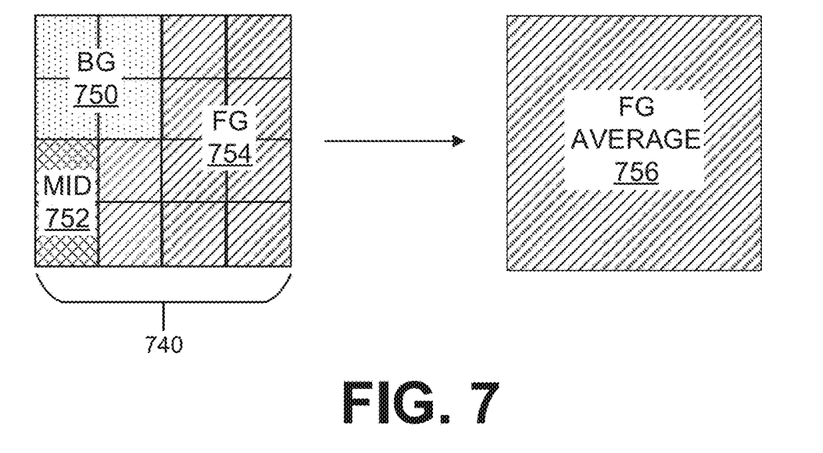
FIG. 7 schematically shows an example of a pixelwise MV conversion into a block MV.

FIG. 7 shows an example of processing the pixel MVs into the block MVs. In this case, a block of pixels 740 includes a collection of foreground pixels 754 (shown in FIG. 7 as being hatched in one direction for visual clarity), a collection of background pixels 750 (shown in FIG. 7 as being hatched in a perpendicular direction for visual clarity) and a collection of mid-range pixels 752 (shown in FIG. 7 as being cross-hatched for visual clarity) are shown. Depth is used to decide which range each pixel belongs to, e.g., pixels within a first depth range are assigned as being background pixels, pixels within a second depth range are assigned as being mid-range pixels, and pixels of a third depth range are assigned as being foreground pixels. Since the majority of pixels within the block of pixels 740 fall within the foreground depth range, the depth values of the foreground pixels 754 are averaged to produce a single depth value that is applied to all pixels of the block MV, thereby generating a block MV 756. In addition, the x- and y- components (not shown) of the foreground MVs are also averaged and output in the block MV. The block MV is therefore comprised of three semi-independent textures: the x-component, the y-component, and the depth component, each independently averaged within the pixels fitting within the depth range. This technique applies to both MV1 and MV0.

Figure 8:
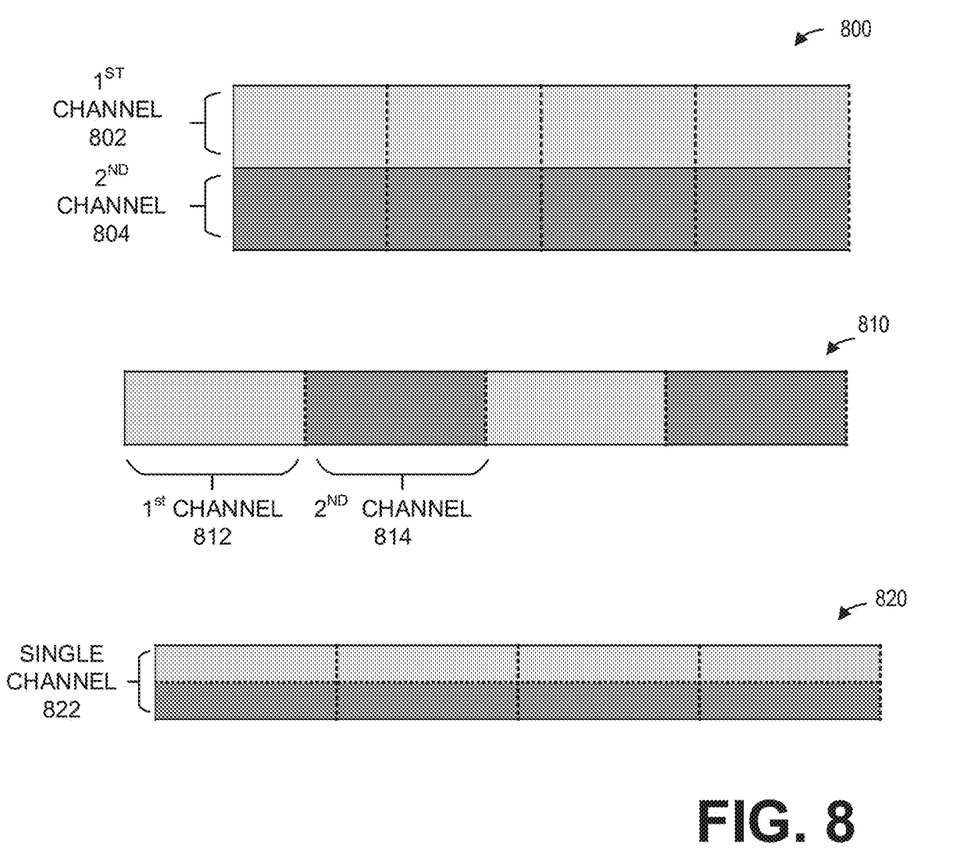
FIG. 8 schematically shows three different methods for dividing data into two separate channels, according to examples of the present disclosure.

FIG. 8 shows the different methods for transmitting data on two separate channels. In a first example 800, a first physical channel 802 and a second physical channel 804 are used to simultaneously transmit two different kinds of data, objects with and without motion vectors, for example. Note that the sizes of the two channels need not necessarily be equal. A second example 810 is shown, with a first time-separated channel 812 and a second time-separated logical channel 814. In this method, a single physical channel 816 alternately sends objects with motion vectors and objects without motion vectors. In a third example 820, a single physical channel 822 is divided into two spatially-separated channels of fixed size. This allows information to be simultaneously transferred over the single channel 822. With access to separate information for objects with MVs and objects without MVs, the image processing module does not have to perform exclusion calculation and may take advantage of greater accuracy when performing visual enhancement algorithms, such as framerate conversion.

The technical effect of generating an MV1 texture and an MV0 texture of a current frame, where the MV1 texture and the MV0 texture each include depth values, is that the MV1 texture and MV0 texture may be converted to MV1 and MV0 blocks, respectively, using the depth values so that the resulting motion vector may more closely match the motion occurring within the frame. Another technical effect is the block MV1 and block MV0 with depth values may be used to perform frame interpolation, thereby increasing a framerate.

The disclosure also provides support for a method, comprising: generating, for each pixel of one or more objects to be rendered in a current frame, a 1-phase motion vector (MV1) and a 0-phase motion vector (MV0), each MV1 and MV0 having an associated depth value, to thereby form an MV1 texture and an MV0 texture, converting the MV1 texture to a set of MV1 blocks and converting the MV0 texture to a set of MV0 blocks, and outputting the set of MV1 blocks and the set of MV0 blocks for image processing. In a first example of the method represents a change in a position of an object at that pixel from the current frame to a previous frame, and wherein each MV0 represents a change in a position of the object at that pixel from the previous frame to the current frame. In a second example of the method, optionally including the first example, converting the MV1 texture to the set of MV1 blocks comprises: identifying, for each pixel block of a plurality of pixel blocks, a predominant pixel type in that pixel block, and converting each pixel block to a respective MV1 block based on the predominant pixel type. In a third example of the method, optionally including one or both of the first and second examples, converting each pixel block to a respective MV1 block based on the predominant pixel type comprises: determining that the predominant pixel type for a selected pixel block is foreground pixels, and in response, calculating an average MV1 over only foreground pixels in that pixel block, and setting the average MV1 as an MV1 value for that MV1 block. In a fourth example of the method, optionally including one or more or each of the first through third examples, converting the MV0 texture to the set of MV0 blocks comprises: identifying, for each pixel block of a plurality of pixel blocks, a predominant pixel type in that pixel block, and converting each pixel block to a respective MV0 block based on the predominant pixel type. In a fifth example of the method, optionally including one or more or each of the first through fourth examples, converting each pixel block to a respective MV0 block based on the predominant pixel type comprises: determining that the predominant pixel type for a selected pixel block is foreground pixels, and in response, calculating an average MV0 over only foreground pixels in that pixel block, and setting the average MV0 as an MV0 value for that MV0 block. In a sixth example of the method, optionally including one or more or each of the first through fifth examples, outputting the set of MV1 blocks and the set of MV0 blocks comprises outputting the set of MV1 blocks and the set of MV0 blocks with frame level metadata and image data for image processing. In a seventh example of the method, optionally including one or more or each of the first through sixth examples, the image data is separated into objects with motion vectors and objects without motion vectors, and the objects with motion vectors are sent on a separate channel than the objects without motion vectors. In an eighth example of the method, optionally including one or more or each of the first through seventh examples, objects without motion vectors comprise overlays, particle effects, scene transitions, GUI elements, gun reticules, and/or smoke effects. In a ninth example of the method, optionally including one or more or each of the first through eighth examples, the method further comprises: applying a double-confirm process to each MV0 and each MV1, wherein the double-confirm process includes confirming each associated depth value. In a tenth example of the method, optionally including one or more or each of the first through ninth examples, applying the double-confirm process includes adjusting one or more non-confirmed MV1s and/or MV0s based on a nearest double-confirmed MV1 and/or MV0. In a eleventh example of the method, optionally including one or more or each of the first through tenth examples, applying the double-confirm process includes, for a selected pixel in the current frame, double confirming the MV1 or MV0 for the selected pixel responsive to coordinates of the selected pixel in the current frame matching coordinates of that pixel mapped back to a previous frame using the MV1 or MV0 for the selected pixel, the coordinates of the selected pixel including a depth coordinate.

The disclosure also provides support for a system for rendering 3D graphics, comprising: one or more processors and non-transitory memory allocated to form: a 3D motion vector module configured to receive a 3D model from a game engine and configured to output a plurality of 1-phase 3D motion vectors (3D MV1s) and a plurality of 0-phase 3D motion vectors (3D MV0s) based on the 3D model, each 3D MV1 comprising a change in a vertical position, a change in a horizontal position, and a change in a depth position of an object at a respective pixel from a current frame to a previous frame, each MV0 comprising a change in a vertical position, a change in a horizontal position, and a change in a depth position of an object at a respective pixel from the previous frame to the current frame, and a block motion vector module configured to generate a 2.5D block MV1 texture and a 2.5D block MV0 texture from the plurality of 3D MV1s and the plurality of 3D MV0s, respectively, and output the 2.5D block MV1 texture and the 2.5D block MV0 texture for image processing in order to form an image to be displayed on a display, wherein the 2.5D block MV1 texture comprises a plurality of MV1 blocks each formed from a respective subset of the plurality of 3D MV1s, and wherein the 2.5D block MV0 texture comprises a plurality of MV0 blocks each formed from a respective subset of the plurality of 3D MV0s. In a first example of the system, the block MV1 texture and the 2.5D block MV0 texture are usable to interpolate a frame between the current frame and the previous frame. In a second example of the system, optionally including the first example, the block MV1 texture is formed from a respective subset of double-confirmed and/or corrected 3D MV1s and the 2.5D block MV0 texture is formed from a respective subset of double-confirmed and/or corrected 3D MV0s. In a third example of the system, optionally including one or both of the first and second examples, each MV1 block comprises an average change in horizontal position for that respective subset of the plurality of 3D MV1s, an average change in vertical position for that respective subset of the plurality of 3D MV1s, and an average depth value for that respective subset of the plurality of 3D MV1s, and wherein each MV0 block comprises an average change in horizontal position for that respective subset of the plurality of 3D MV0s, an average change in vertical position for that respective subset of the plurality of 3D MV0s, and an average depth value for that respective subset of the plurality of 3D MV0s.

The disclosure also provides support for a method, comprising: generating, for each pixel of one or more objects to be rendered in a current frame, a 1-phase motion vector (MV1) and a 0-phase motion vector (MV0), each MV1 and MV0 having an associated change in depth, to thereby form an MV1 texture and an MV0 texture, applying a double-confirm process to each MV0 and each MV1, wherein the double-confirm process includes confirming each associated change in depth, correcting each non-double confirmed MV0s and MV1s, converting the MV1 texture to a set of MV1 blocks and converting the MV0 texture to a set of MV0 blocks, each MV1 block and each MV0 block having an associated depth value, including identifying, for each pixel block of a plurality of pixel blocks, a predominant pixel type in that pixel block and converting each pixel block to a respective MV0 block and a respective MV1 based on the predominant pixel type, and outputting the set of MV1 blocks and the set of MV0 blocks for image processing. In a first example of the method represents a change in a position of an object at that pixel from the current frame to a previous frame, and wherein each MV0 represents a change in a position of the object at that pixel from the previous frame to the current frame. In a second example of the method, optionally including the first example, converting each pixel block to a respective MV0 block and a respective MV1 block based on the predominant pixel type comprises: if the predominant pixel type is background pixels, calculating an average MV0 and an average MV1 over all pixels in that pixel block, otherwise calculating the average MV0 and the average MV1 over only foreground pixels in that pixel block, and setting the average MV0 as an MV0 value for that MV0 block and the average MV1 as an MV1 value for that MV1 block. In a third example of the method, optionally including one or both of the first and second examples, applying the double-confirm process includes, for a selected pixel in the current frame, double confirming the MV1 or MV0 for the selected pixel responsive to coordinates of the selected pixel in the current frame matching coordinates of that pixel mapped back to a previous frame using the MV1 or MV0 for the selected pixel, the coordinates of the selected pixel including a depth coordinate.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
generating, for each pixel of one or more objects to be rendered in a current frame, a 1-phase motion vector (MV1) and a 0-phase motion vector (MV0), each MV1 and MV0 having an associated depth value, to thereby form an MV1 texture and an MV0 texture;
converting the MV1 texture to a set of MV1 blocks and converting the MV0 texture to a set of MV0 blocks; and
outputting the set of MV1 blocks and the set of MV0 blocks for image processing.

2. The method of claim 1, wherein each MV1 represents a change in a position of an object at that pixel from the current frame to a previous frame, and wherein each MV0 represents a change in a position of the object at that pixel from the previous frame to the current frame.

3. The method of claim 1, wherein converting the MV1 texture to the set of MV1 blocks comprises:
identifying, for each pixel block of a plurality of pixel blocks, a distribution of pixel types in that pixel block; and
converting each pixel block to a respective MV1 block based on the distribution of pixel types.

4. The method of claim 3, wherein converting each pixel block to a respective MV1 block based on the distribution of pixel types comprises:
determining that a first selected pixel block has a non-bimodal distribution such that only ore predominantly mid-range pixels are present, and in response, calculating an average MV1 over only mid-range pixels in the first selected pixel block;
determining that a second selected pixel block has a bimodal distribution such that the second selected pixel block includes at least one foreground pixel and at least one background pixel, and in response, calculating an average MV1 over only foreground pixels in the second selected pixel block; and setting each average MV1 as an MV1 value for the respective MV1 block.

5. The method of claim 1, wherein converting the MV0 texture to the set of MV0 blocks comprises:
identifying, for each pixel block of a plurality of pixel blocks, a distribution of pixel types in that pixel block; and
converting each pixel block to a respective MV0 block based on the distribution of pixel types.

6. The method of claim 5, wherein converting each pixel block to a respective MV0 block based on the distribution of pixel types comprises:
determining that a first selected pixel block has a non-bimodal distribution such that only or predominantly mid-range pixels are present, and in response, calculating an average MV0 over only mid-range pixels in the first selected pixel block;
determining that a second selected pixel block has a bimodal distribution such that the second selected pixel block includes at least one foreground pixel and at least one background pixel, and in response, calculating an average MV0 over only foreground pixels in the second selected pixel block; and
setting each average MV0 as an MV0 value for the respective MV0 block.

7. The method of claim 1, wherein outputting the set of MV1 blocks and the set of MV0 blocks comprises outputting the set of MV1 blocks and the set of MV0 blocks with frame level metadata and image data for image processing.

8. The method of claim 7, wherein the image data is separated into objects with motion vectors and objects without motion vectors, and the objects with motion vectors are sent on a separate channel than the objects without motion vectors.

9. The method of claim 8, wherein objects without motion vectors comprise overlays, particle effects, scene transitions, GUI elements, gun reticules, and/or smoke effects.

10. The method of claim 1, further comprising applying a double-confirm process to each MV0 and each MV1, wherein the double-confirm process includes confirming each associated depth value.

11. The method of claim 10, wherein applying the double-confirm process includes adjusting one or more non-confirmed MV1s and/or MV0s based on a nearest double-confirmed MV1 and/or MV0.

12. The method of claim 10, wherein applying the double-confirm process includes, for a selected pixel in the current frame, double confirming the MV1 or MV0 for the selected pixel responsive to coordinates of the selected pixel in the current frame matching coordinates of that pixel mapped back to a previous frame using the MV1 or MV0 for the selected pixel, the coordinates of the selected pixel including a depth coordinate.

13. A system for rendering 3D graphics, comprising:
one or more processors and non-transitory memory allocated to form:
a 3D motion vector module configured to receive a 3D model from a game engine and configured to output a plurality of 1-phase 3D motion vectors (3D MV1s) and a plurality of 0-phase 3D motion vectors (3D MV0s) based on the 3D model, each 3D MV1 comprising a change in a vertical position, a change in a horizontal position, and a change in a depth position of an object at a respective pixel from a current frame to a previous frame, each MV0 comprising a change in a vertical position, a change in a horizontal position, and a change in a depth position of an object at a respective pixel from the previous frame to the current frame; and
a block motion vector module configured to generate a 2.5D block MV1 texture and a 2.5D block MV0 texture from the plurality of 3D MV1s and the plurality of 3D MV0s, respectively, and output the 2.5D block MV1 texture and the 2.5D block MV0 texture for image processing in order to form an image to be displayed on a display, wherein the 2.5D block MV1 texture comprises a plurality of MV1 blocks each formed from a respective subset of the plurality of 3D MV1s, and wherein the 2.5D block MV0 texture comprises a plurality of MV0 blocks each formed from a respective subset of the plurality of 3D MV0s.

14. The system of claim 13, wherein the 2.5D block MV1 texture and the 2.5D block MV0 texture are usable to interpolate a frame between the current frame and the previous frame.

15. The system of claim 13, wherein the 2.5D block MV1 texture is formed from a respective subset of double-confirmed and/or corrected 3D MV1s and the 2.5D block MV0 texture is formed from a respective subset of double-confirmed and/or corrected 3D MV0s.

16. The system of claim 13, wherein each MV1 block comprises an average change in horizontal position for that respective subset of the plurality of 3D MV1s, an average change in vertical position for that respective subset of the plurality of 3D MV1s, and an average depth value for that respective subset of the plurality of 3D MV1s, and wherein each MV0 block comprises an average change in horizontal position for that respective subset of the plurality of 3D MV0s, an average change in vertical position for that respective subset of the plurality of 3D MV0s, and an average depth value for that respective subset of the plurality of 3D MV0s.

17. A method, comprising:
generating, for each pixel of one or more objects to be rendered in a current frame, a 1-phase motion vector (MV1) and a 0-phase motion vector (MV0), each MV1 and MV0 having an associated change in depth, to thereby form an MV1 texture and an MV0 texture;
applying a double-confirm process to each MV0 and each MV1, wherein the double-confirm process includes confirming each associated change in depth;
correcting each non-double confirmed MV0s and MV1s;
converting the MV1 texture to a set of MV1 blocks and converting the MV0 texture to a set of MV0 blocks, each MV1 block and each MV0 block having an associated depth value, including identifying, for each pixel block of a plurality of pixel blocks, a distribution of pixel types in that pixel block and converting each pixel block to a respective MV0 block and a respective MV1 block based on the distribution of pixel types; and
outputting the set of MV1 blocks and the set of MV0 blocks for image processing.

18. The method of claim 17, wherein each MV1 represents a change in a position of an object at that pixel from the current frame to a previous frame, and wherein each MV0 represents a change in a position of the object at that pixel from the previous frame to the current frame.

19. The method of claim 17, wherein converting each pixel block to a respective MV0 block and a respective MV1 block based on the distribution of pixel types comprises:
if the distribution is bimodal such that at least one background pixel and at least one foreground pixel are present, calculating an average MV0 and an average MV1 over only foreground pixels in that pixel block, otherwise calculating the average MV0 and the average MV1 over only mid-range pixels in that pixel block; and setting the average MV0 as an MV0 value for that MV0 block and the average MV1 as an MV1 value for that MV1 block.

20. The method of claim 17, wherein applying the double-confirm process includes, for a selected pixel in the current frame, double confirming the MV1 or MV0 for the selected pixel responsive to coordinates of the selected pixel in the current frame matching coordinates of that pixel mapped back to a previous frame using the MV1 or MV0 for the selected pixel, the coordinates of the selected pixel including a depth coordinate.

\* \* \* \* \*